June 23, 1953　　　G. E. FLINN　　　2,642,844

CLUTCH PISTON SAFETY VALVE

Filed Dec. 9, 1948

Inventor:
George E. Flinn

Patented June 23, 1953

2,642,844

UNITED STATES PATENT OFFICE 2,642,844

CLUTCH PISTON SAFETY VALVE

George E. Flinn, Muncie, Ind., assignor to Borg-Warner Corporation, Chicago, Ill., a corporation of Illinois Application December 9, 1948, Serial No. 64,361

4 Claims. (Cl. 121—38)

My invention relates to fluid pressure actuated friction clutches and more particularly to the fluid pressure responsive piston mechanism for actuating the clutches.

In the past, difficulty has been had with clutches actuated by a fluid pressure responsive piston in that the fluid retained in the cavity for the piston, when the supply of fluid to the piston was cut off, was effective due to the centrifugal force acting on this residual fluid to cause engagement of the clutch when no engagement was desired.

It is an object of the invention to provide an improved clutch piston arrangement which allows the release of the residual fluid remaining in the bore for the piston when the fluid supply is cut off. It is a more specific object to provide a valve for opening and closing a relief passage which is responsive to the fluid pressure supplied to the bore for the clutch piston, so that the valve is closed when clutch engaging fluid pressure is supplied to the piston but is otherwise open.

It is a further object of the invention to provide a clutch piston arrangement of the character set forth above which operates during actual clutch disengagement to apply a charge of lubricant directly onto the clutch plates. Therefore, upon each complete cycle of clutch engagement and disengagement, thorough lubrication of the clutch plates is attained.

Figure 1:
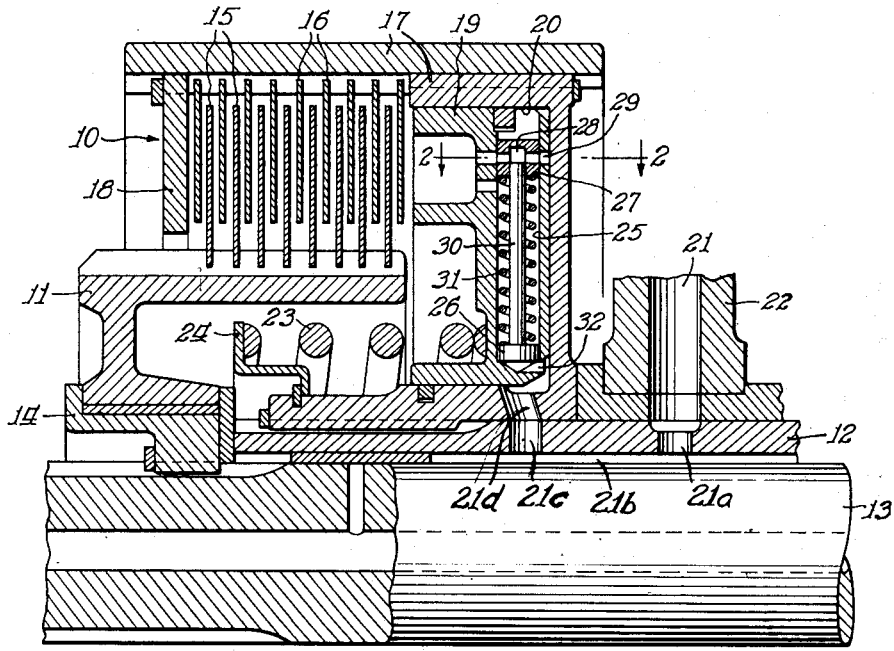
Figure 2:
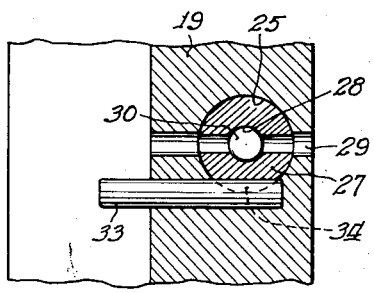

The invention consists of the novel constructions, arrangements and devices to be hereinafter described and claimed for carrying out the above-stated objects and such other objects as will appear from the following description of a preferred embodiment of the invention illustrated with reference to the accompanying drawing, wherein:

Fig. 1 is a fragmentary, sectional view through a multiple plate friction clutch and piston arrangement for applying the same illustrating the principles of the invention; and Fig. 2 is a sectional view taken on line 2—2 of Fig. 1.

Like characters of reference designate like parts in the several views.

Referring now to the drawing, a multiple plate clutch 10 is provided for connecting a member 11 with a shaft 12. The shaft 12 is in the form of a sleeve and is rotatably disposed on a central shaft 13. The member 11 is also rotatably disposed with respect to the shaft 13 by means of a hub 14.

The clutch comprises interleaved clutch discs 15 and 16. The clutch discs 15 are splined on the element 11, and the clutch discs 16 are splined on a drum 17 which in turn is splined on the shaft 12. A backing plate 18 is fixed within the drum 17, and a piston 19 is provided for compressing the discs between it and the backing plate 18 for engaging the clutch.

The piston 19 is of cylindrical design and is slidably disposed within an annular bore 20 provided in the drum 17. Fluid under pressure from any suitable source may be induced into the space existing in the bore 20 at the forward side of the piston 19 by means of a conduit 21 which communicates with a passage 21a which in turn communicates with the space 21b existing between the shafts 12 and 13. The space 21b communicates with a passage 21c extending through the shaft 12, which passage in turn communicates with an inlet port 21d provided in the drum 17. A spring 23 is provided between the piston 19 and a retainer ring 24 which is fixed with respect to the drum 17. The spring 23 yieldably holds the piston 19 in its clutch disengaged position in which it is illustrated.

The piston 19 is provided with an internal cylindrical cavity 25, and a piston 26 is slidably disposed in the cavity. The cavity 25 is closed on its outer end by means of a plug 27. The plug has a central bore 28 which is in communication with a fluid passage 29 extending through the piston 19 and the plug from one side to the other. The passage 29 is adjacent the outer periphery of the bore 20 as will be noted. The piston 26 has a stem 30 extending into the bore 28, and a spring 31 is provided for yieldably holding the piston 26 in its illustrated position in which it opens the passage 29 from one side of the piston to the other. A passage 32 is provided in the piston 19 connecting the inner end of the cavity 25 with the bore 20 for purposes hereinafter to be described. The plug 27 is fixed in the cavity 25 by means of a pin 33 extending through the piston 19 and into a groove 34 in the plug.

The particular construction illustrated in connection with the clutch 10 and its piston 19 is one shown in a prior application of Donald W. Kelbel, Serial No. 793,006, and it will be understood that many other different constructions in lieu of the one illustrated may be used in connection with the piston 19. In the illustrated construction, when fluid under pressure is applied through the conduit 21 within the bore 20, it moves the piston 19 to the left as seen in Fig. 1 against the action of the spring 23 to engage the interleaved clutch discs 15 and 16 with each other.

However, it will be noted that the clutch spring 23 is much larger and hence much stronger than the valve spring 31. Further, it will be noted that the piston 19 is normally held in a position wherein its flat end surface is in conforming contact with the flat end surface of the bore 20 so that communication between the passages 21d and 29 is cut off until the piston 19 has been moved initially by fluid pressure acting on the radially inward piston surfaces which do not engage the wall of the bore. Therefore, it is readily apparent that fluid pressure introduced through the passage 21d will enter the passage 32 and fully actuate the valve piston 26 against the bias of the light spring 31 to close the passage 29 by means of the stem 30 before the pressure acting on the small area of the radially inward surfaces of the clutch piston 19 becomes great enough to actuate the clutch piston against the bias of the much stronger clutch spring 23. In other words, the inherent operation of the construction shown is the initial actuation of the valve piston 26 and then subsequent actuation of the clutch piston 19 as the fluid pressure increases.

The fluid under pressure within the conduit 21 is released to allow the spring 23 to move the piston 19 back into its clutch disengaged positon in which it is illustrated. Under these circumstances, a certain residual amount of fluid would remain in the bore 20 and behind the piston 19, were it not for the passage 29 provided to effect its release, and when the drum 17 and piston 19 are rotating at high speeds, the centrifugal force on the fluid would move the piston 19 in the bore 20 to the left as seen in Fig. 1 to engage the clutch 10 at a time when actually no engagement is desired. The piston 26 when the fluid pressure is relieved in conduit 21 moves inwardly in its cavity 25 against whatever centrifugal force may be acting on the piston under the action of the spring 31 to open the passage 29 and whatever fluid there is in the outer portion of the bore 20 may escape through the passage 29 to the other side of the piston 19, so that the fluid is not present in the bore 20 adjacent its outer periphery to cause this undesired engagement of the clutch 10. Such passage of fluid to the rearward side of the piston serves to deposit a charge of lubricant directly onto the clutch plates 15 and 16 each time the complete clutch engaging and disengaging cycle takes place.

I wish it to be understood that my invention is not to be limited to the specific constructions, arrangements and devices shown and described except only insofar as the claims may be so limited, as it will be apparent to those skilled in the art that changes may be made without departing from the principles of the invention.

I claim:

1. In a hydraulic system, in combination, a rotatable member having a hollow bore, a piston in said bore, means for supplying fluid under pressure into said bore and including a conduit connected with the bore substantially at its inner periphery, said piston being provided with a fluid discharge opening therein adjacent its outer periphery for releasing fluid within the bore so that fluid under centrifugal force in the bore will not be effective to move the piston when no fluid is supplied through said conduit to said bore, a valve carried by said piston and effective for opening and closing said discharge passage and responsive to the fluid pressure within said conduit, and means acting on said valve to prevent movement of the valve due to centrifugal force.

2. In a hydraulic system, in combination, a rotatable member having a hollow bore, a piston in said bore, means including a conduit for supplying fluid under pressure into said bore at the inner periphery of the bore for moving said piston, means forming a fluid relief passage in said piston adjacent its outer periphery so that fluid under centrifugal force in said bore will not be effective to move the piston when no fluid is supplied through said conduit, and a valve in said piston for opening and closing said fluid relief passage and in communication with the fluid in said conduit so that said fluid relief passage is closed when fluid is supplied to said bore through said conduit, and a spring effective on said valve for counteracting centrifugal force on the valve to yieldably hold it in its fluid relief passage opening position, when no fluid is supplied through said conduit.

3. In a hydraulic system, in combination, a rotatable member having a hollow bore, a piston in said bore, said piston being provided with a fluid discharge passage therein adjacent its outer periphery, a fluid pressure responsive valve carried by said piston and effective for opening and closing said discharge passage, and means including a conduit for supplying fluid under pressure for operating said valve and for operating said piston, said fluid discharge passage being effective to release fluid within said bore through said piston so that fluid under centrifugal force in the bore will not be effective to move the piston when no fluid is supplied to said bore, said piston when not operated being substantially flush with said bore and said conduit being connected with said bore and said valve radially inwardly of said discharge passage so that the fluid pressure supplied by the conduit first moves the valve to a discharge passage closing position and thereafter operates said piston whereby fluid pressure in said bore built up by centrifugal force is ineffective to hold said valve in said discharge passage closing position upon release of the pressure fluid from said bore through said conduit, and means acting on said valve to prevent movement of the valve due to centrifugal force.

4. In a hydraulic system, in combination, a rotatable member having a hollow bore, a piston in said bore, said piston being provided with a fluid discharge passage therein adjacent its outer periphery, a fluid pressure responsive valve carried by said piston and effective for opening and closing said discharge passage, means including a conduit for supplying fluid under pressure for operating said valve and for operating said piston, said fluid discharge opening being effective to release fluid within said bore through said piston so that fluid under centrifugal force in the bore will not be effective to move the piston when no fluid is supplied to said bore, said piston when not operated being substantially flush with said bore and said conduit being connected with said bore and said valve radially inwardly of said discharge passage so that the fluid pressure supplied by the conduit first moves the valve to discharge passage closing position and thereafter operates said piston whereby fluid pressure in said bore built up by centrifugal force is ineffective to hold said valve in said discharge passage closing position upon release of the pressure fluid from said bore through said conduit, and a spring effective on said valve for counteracting centrifugal force on the valve to yieldably hold it in a fluid discharge passage opening position.

GEORGE E. FLINN.

References Cited in the file of this patent

UNITED STATES PATENTS

| Number | Name | Date |
|--------|------|------|
| 644,749 | Wiehl | Mar. 6, 1900 |
| 2,120,092 | Doran | June 7, 1938 |
| 2,163,203 | Kegresse | Jan. 20, 1939 |
| 2,178,017 | Tedden et al. | Oct. 31, 1939 |
| 2,245,857 | Hale | June 17, 1941 |
| 2,404,822 | Advey | Jan. 30, 1946 |
| 2,462,657 | McNairy | Feb. 22, 1949 |
| 2,512,360 | McLean | Jan. 20, 1950 |

FOREIGN PATENTS

| Number | Country | Date |
|--------|---------|------|
| 402,912 | Germany | Feb. 15, 1924 |
| 643,678 | Germany | Mar. 25, 1937 |